US012567734B2

(12) United States Patent　　　　　(10) Patent No.:　　US 12,567,734 B2
Gauthier et al.　　　　　　　　　　　　(45) Date of Patent:　　　Mar. 3, 2026

(54) VEHICLE LOW-VOLTAGE POWER DISTRIBUTION WITHOUT FUSES

(71) Applicant: Atieva, Inc., Newark, CA (US)

(72) Inventors: Jean-Philippe Gauthier, Oakland, CA (US); Thomas Joel Huber, San Francisco, CA (US)

(73) Assignee: Atieva, Inc., Newark, CA (US)

( * ) Notice: Subject to any disclaimer, the term of this patent is extended or adjusted under 35 U.S.C. 154(b) by 266 days.

(21) Appl. No.: 18/447,823

(22) Filed: Aug. 10, 2023

(65) Prior Publication Data

US 2025/0055273 A1　　Feb. 13, 2025

(51) Int. Cl.
H02H 7/20　　　(2006.01)
B60R 16/033　　(2006.01)
H02H 1/00　　　(2006.01)

(52) U.S. Cl.
CPC ............. H02H 7/20 (2013.01); B60R 16/033 (2013.01); H02H 1/0007 (2013.01)

(58) Field of Classification Search
CPC ... B60R 16/0238; B60R 16/03; B60R 16/033; H02H 1/0007; H02H 3/087; H02H 7/20
See application file for complete search history.

(56) References Cited

U.S. PATENT DOCUMENTS

| | | | | |
|---|---|---|---|---|
| 5,596,236 | A | * | 1/1997 | Lee ........................ A47L 9/2847 |
| | | | | 318/497 |
| 8,803,485 | B2 | | 8/2014 | Chuang et al. |
| 9,221,409 | B1 | | 12/2015 | Gauthier et al. |
| 9,227,581 | B1 | | 1/2016 | Gauthier et al. |
| 9,543,870 | B1 | | 1/2017 | Gauthier et al. |
| 9,899,658 | B2 | | 2/2018 | Biskup et al. |
| 2011/0148201 | A1 | | 6/2011 | Chuang |
| 2017/0110874 | A1 | * | 4/2017 | Van Dijk ................. H02H 3/08 |
| 2017/0282819 | A1 | * | 10/2017 | Emrani .................... H02H 3/38 |
| 2018/0069389 | A1 | * | 3/2018 | Ihlenburg .............. H02H 7/261 |
| 2022/0190583 | A1 | * | 6/2022 | Fernandez Pueyo ........................ |
| | | | | B60R 16/023 |
| 2023/0073390 | A1 | | 3/2023 | Namuduri et al. |
| 2023/0187922 | A1 | * | 6/2023 | Randazzo .............. H02H 5/048 |
| | | | | 361/87 |
| 2023/0294621 | A1 | * | 9/2023 | Geula ................... B60R 16/033 |

OTHER PUBLICATIONS

International Search Report and Written Opinion for PCT Application No. PCT/US2024/041524, mailed on Dec. 4, 2024, 16 pages.

* cited by examiner

Primary Examiner — Danny Nguyen
Assistant Examiner — Nicolas Bellido
(74) Attorney, Agent, or Firm — Brake Hughes Bellermann LLP

(57)　　　　　　　ABSTRACT

A vehicle comprises: a low-voltage battery to provide low-voltage power; devices configured to operate using the low-voltage power, each of the devices coupled to the low-voltage battery by a corresponding conductor, wherein the devices comprise all consumers of the low-voltage power in the vehicle; switches to selectively interrupt the low-voltage power between the low-voltage battery and any of the devices, each of the switches positioned in a respective conductor of the conductors; and a central processing unit configured to detect an overload condition regarding any of the switches, and to open, in response to detecting the overload condition, the switch of the conductor between the low-voltage battery and the corresponding one of the devices.

20 Claims, 4 Drawing Sheets

VEHICLE LOW-VOLTAGE POWER DISTRIBUTION WITHOUT FUSES

TECHNICAL FIELD

This document relates to a vehicle low-voltage power distribution without fuses.

BACKGROUND

Historically, low-voltage (e.g., 12 volt) electrical power has been distributed through a vehicle using a wiring harness connected to a power distribution center. The power distribution center receives power through a large power input and outputs power to the wiring harness through standard fuses. A fuse is an electrical device that breaks the circuit if an excessive amount of current crosses it. The purpose of the fuse is to stop current flow if excessive current endangers the wiring harness.

Fuses have been used extensively because they are relatively inexpensive, well known and reliable. Fuses must be easy to replace for the driver/owner of the vehicle so the vehicle can be quickly serviced in case of a blown fuse. The power distribution centers have therefore been provided with an access panel, which tends to complicate the options for packaging the power distribution center and could be responsible for water intrusion. Moreover, replacement fuses have to be kept at hand in the event of a fuse failure. Many fuses use a common connection geometry, and a fuse may accidentally be replaced with one of a different rating, which might damage the wiring harness. Finally, production tolerances of fuses are often kept very wide.

SUMMARY

In a first aspect, a vehicle comprises: a low-voltage battery to provide low-voltage power; devices configured to operate using the low-voltage power, each of the devices coupled to the low-voltage battery by a corresponding conductor, wherein the devices comprise all consumers of the low-voltage power in the vehicle; switches to selectively interrupt the low-voltage power between the low-voltage battery and any of the devices, each of the switches positioned in a respective conductor of the conductors; and a central processing unit configured to detect an overload condition regarding any of the switches, and to open, in response to detecting the overload condition, the switch of the conductor between the low-voltage battery and the corresponding one of the devices.

Implementations can include any or all of the following features. The central processing unit and the switches are included in a distribution center. The vehicle includes multiple distribution centers among which the switches are distributed, each of the distribution centers having a respective central processing unit. The distribution center is packaged so as to not be customer accessible. The vehicle further comprises an electronic control unit configured for providing an enable command to the central processing unit, wherein the central processing unit is further configured to close the switches in response to the enable command. The central processing unit is further configured to open the switches in response to the enable command no longer being generated by the electronic control unit. A first device of the devices is designated to operate also when the vehicle is in an off mode in which the electronic control unit is turned off, wherein a first switch of the switches is positioned in a first conductor of the conductors, the first conductor positioned between the low-voltage battery and the first device, the vehicle further comprising: a latch coupled to the first switch, wherein the central processing unit is further configured to periodically wake up during the off mode and monitor the first switch for the overload condition, and actuate the latch to open the first switch in response to detecting the overload condition. The central processing unit is configured to detect the overload condition by determining respective temperatures of the switches. The central processing unit is configured to detect the overload condition by sensing respective currents flowing through the switches. The central processing unit is configured to detect the overload condition upon determining that a current threshold is met. The central processing unit is configured to detect the overload condition by performing a heat accumulation calculation based on the currents. At least one of the switches is a multiplex switch positioned in at least two of the conductors corresponding to respective at least two of the switches, the multiplex switch having a select pin that the central processing unit is configured to use in sensing the respective currents flowing through the respective at least two of the conductors. Each of the switches comprises an electronic fuse. The low-voltage power is about 12 volts.

In a second aspect, a vehicle comprises: a low-voltage battery to provide low-voltage power; devices configured to operate using the low-voltage power, each of the devices coupled to the low-voltage battery by a corresponding conductor, a first device designated to operate also when the vehicle is in an off mode; switches to selectively interrupt the low-voltage power between the low-voltage battery and any of the devices, each of the switches positioned in a corresponding one of the conductors, a first switch positioned in a first conductor between the low-voltage battery and the first device; a latch coupled to the first switch; and a central processing unit configured to i) monitor the switches for an overload condition while the vehicle is in an on mode, and in response to detecting the overload condition, open the switch of the conductor between the low-voltage battery and the corresponding one of the devices, and ii) periodically wake up during the off mode and monitor the first switch for the overload condition, and actuate the latch to open the first switch in response to detecting the overload condition.

Implementations can include any or all of the following features. The vehicle further comprises an electronic control unit configured for providing an enable command to the central processing unit, wherein the central processing unit is further configured to close the switches, and actuate the latch to close the first switch, in response to the enable command. The central processing unit is further configured to open the switches, except the first switch, in response to the enable command no longer being generated by the electronic control unit. The vehicle further comprises a watchdog circuit coupled to the latch and to the central processing unit, the watchdog circuit configured to i) detect whether the central processing unit fails to wake up during the off mode, and ii) in response to detecting that the central processing unit fails to wake up, disable the latch so that the first switch is opened. The devices comprise all consumers of the low-voltage power in the vehicle. The central processing unit is configured to detect the overload condition by sensing respective currents flowing through the switches.

BRIEF DESCRIPTION OF DRAWINGS

Like reference symbols in the various drawings indicate like elements.

DETAILED DESCRIPTION

Figure 1:
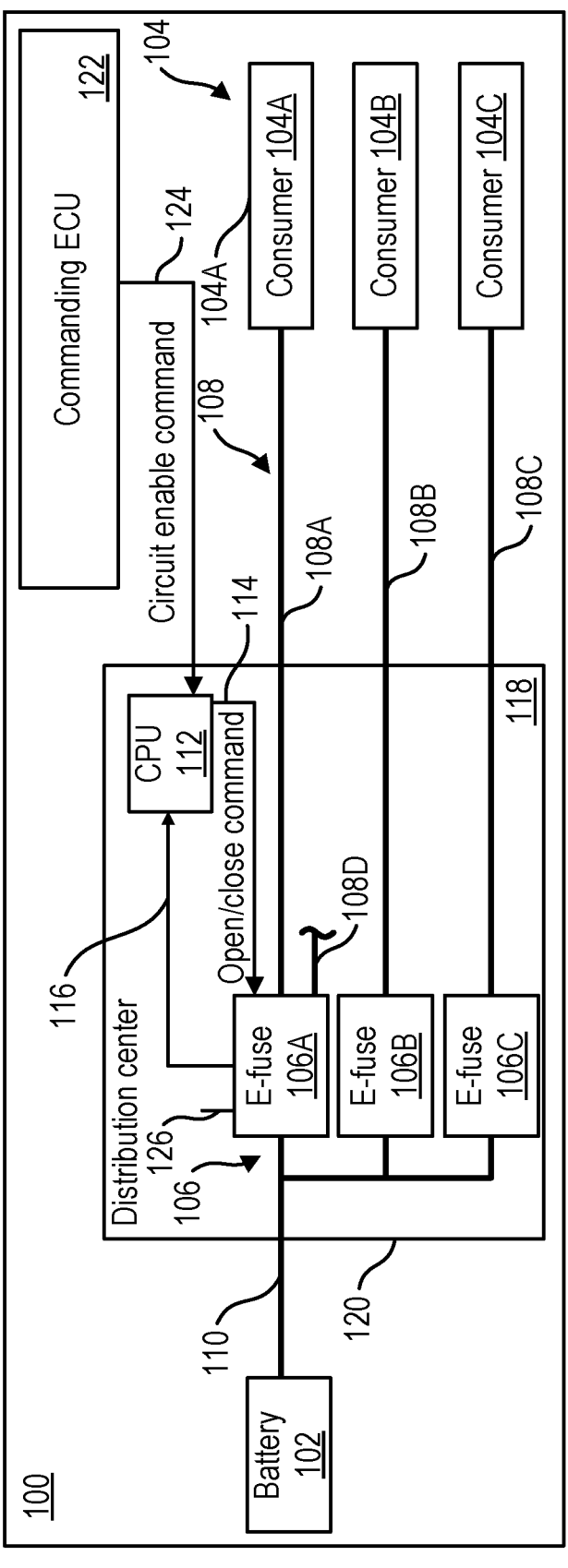
FIG. 1 shows an example of a system that distributes low-voltage power without using fuses.

This document describes examples of vehicle low-voltage systems that provide wiring protection without using fuses. The present subject matter can eliminate fuses and replace them with electronic devices that fulfill the same requirements as the fuses without the disadvantages. A power distribution center can be made out of a processor that executes a program and multiple solid-state switches and current measuring sensors that are controlled by the processor.

A fusing strategy that does not use fuses can be implemented in a program run by a processor. A simple software-based heat accumulator can be used, which inflates or deflates according to the current in the circuit. If the heat accumulation value goes above a calibrated value, the system can interrupt power by opening the circuit. Once the heat accumulation goes below a calibrated value, the circuit is closed to permit power delivery. If these events happen more than a certain number of times in the same drive cycle, the circuit can be turned off indefinitely until the next drive cycle.

Since wiring protection must be assured for any circuit that is powered up, a system can be designed so that it monitors the circuits that stay powered up while the vehicle is turned off. In these cases, the system can employ a latching system to keep the circuit under power, while having the processor wake up at intervals in order to verify that the current is not excessive (e.g., by updating the heat value). This special operation mode can minimize the power consumption of the vehicle while it is turned off.

The present subject matter can provide any or all of the following advantages. A low-voltage power distribution system for a vehicle can be made easier to package since no access panel is necessary. A vehicle low-voltage power distribution system can be made more reliable since the enclosure can easily be made waterproof. A vehicle low-voltage power distribution system can be simpler to diagnose because a processor can report problematic circuits to a diagnostic tool. The need for relays can be eliminated since a solid-state protection device can be used to switch circuits on and off. Wiring protections can be designed with tighter tolerances. A vehicle low-voltage power distribution system can facilitate switching off and on any circuit, making it possible to save power when certain features are not needed.

Examples herein refer to a vehicle. As used herein, a vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle, or the vehicle can be unpowered (e.g., when a trailer is attached to another vehicle). The vehicle can include a passenger compartment accommodating one or more persons. Vehicles in the present examples are shown for illustrative purposes only.

Examples herein refer to a switch. As used herein, a switch is a device that can connect or disconnect a conducting path. In some implementations, a switch includes a solid state device having a mechanism for opening in the event of overheating. For example, a switch can include an electronic fuse (sometimes referred to as an e-fuse) configured to detect an overcurrent. In some implementations, a switch can include a relay.

Examples herein refer to low voltage power. As used herein, a low-voltage power has an operating voltage or difference in potential that is at most about 30 volt (V). Voltages specified herein are direct current (DC) voltages. In some implementations, a low-voltage power can be at most about 24 V. In some implementations, a low-voltage power can be at most about 12 V.

Examples herein refer to a low voltage battery. As used herein, a low voltage battery includes any energy storage system that delivers low-voltage power. A low voltage battery can include one or more electrochemical cells. A low voltage battery can use any technology that stores electric energy. For example, the low voltage battery can include, but is not limited to, a lead-acid battery or a lithium battery.

FIG. 1 shows an example of a system 100 that distributes low-voltage power without using fuses. The system 100 can be used with one or more other examples described elsewhere herein. The system 100 can be installed in a vehicle to distribute low-voltage power to various components. The system 100 includes a low-voltage battery 102 that provides the low-voltage power, and devices 104 that are configured to operate using the low-voltage power (sometimes referred to as consumer devices). Examples of components that can consume low-voltage power in a vehicle include, but are not limited to, lights; heating, ventilation and air conditioning; door locks; door actuators; windshield wipers; electronic control units (ECUs); motors; servo motors; and the like. The devices 104 can include all low-voltage consumers in the vehicle. As such, implementing the system 100 in a vehicle can allow for elimination of any fuses in its low-voltage power operations. Any number of the devices 104 can be used. Here, devices 104A, 104B, and 104C are shown for illustrative purposes.

The system 100 includes switches 106 to interrupt the low-voltage power between the low-voltage battery 102 and any of the devices 104 in the event of an overload. Each of the switches 106 is positioned in a respective one of conductors 108. As such, one of the throws of each of the switches 106 is coupled to a corresponding one of the devices 104. One or more conductors 110 can couple the other throws of the switches 106 to the low-voltage battery 102. Any number of the switches 106 and the conductors 108 can be used. Here, switches 106A, 106B, and 106C are shown for illustrative purposes. Also, conductors 108A, 108B, and 108C, are shown for illustrative purposes.

The switches 106 can selectively interrupt current between the low-voltage battery 102 and any of the devices 104. In some implementations, one or more of the switches 106 includes a solid state device. For example, an electronic fuse can be used. In some implementations, a relay can be used for one or more of the switches 106, the relay configured to detect an overload condition and in response interrupt the current.

The system 100 includes a central processing unit (CPU) 112 that is configured to generate commands 114 to the switches 106. The CPU 112 is implemented using at least one processor configured to execute instructions (e.g., stored in form of a program). The CPU 112 can send the command 114 to one or more of the switches. To cause distribution of low-voltage power, the command 114 can be a close command that causes the switch(es) 106 to close. The CPU 112 is configured to detect an overload condition regarding any of the switches 106 based on a signal 116. Each of the switches 106 has the ability to generate the signal 116. The CPU 112 is configured to open the switch in response to detecting the overload condition. To interrupt the distribution of low-voltage power, the command 114 can be an open command that causes the respective one(s) of the switches 106 to open.

The CPU 112 can detect the overload condition in any of multiple different ways. In some implementations, the CPU 112 senses the respective currents flowing through the switches 106. For example, the signals 116 can then be referred to as respective current signals of the switches 106. The CPU 112 can determine whether a sensed current meets a current threshold in determining whether to interrupt the low-voltage power for the particular switch(es). For example, this can be characterized as applying a hard current limit in the decision whether to open any of the switches 106. Other examples involving sensing of currents are described below.

In some implementations, the CPU 112 senses a temperature of the respective one(s) of the switches 106. The signals 116 can then be referred to as respective temperature signals of the switches 106. For example, the signal 116 can indicate the temperature of an integrated circuit of the solid state device that forms the switch 106. The CPU 112 can apply the sensed switch temperature to a model that indicates the heating of the corresponding conductor 108, so that an overload condition in the conductor can be avoided. One or more temperature thresholds can be applied. For example, one or more fuses can have a different threshold.

The switches 106 and the CPU 112 can be included in a distribution center 118. The distribution center 118 is here schematically illustrated and can be enclosed within a sealed housing 120. For example, the sealed housing 120 can form an enclosed container having sealed entrances and exits for the conductors 108 and 110. The sealed housing 120 can be made of one or more materials resistant to water, dust and/or other contaminants. The distribution center 118 can be packaged so that the inside of the sealed housing 120 is not accessible to a customer (e.g., the driver/owner) of the vehicle. For example, this can eliminate the challenge of needing to ensure accessibility (as in the case of fuses) while preventing against intrusion by unwanted substances. The vehicle can have one or more of the distribution centers 118.

The system 100 can include an electronic control unit (ECU) 122. The ECU 122 can be implemented using at least one processor (e.g., a microcontroller) and at least one memory. The ECU 122 is configured for providing an enable command 124 to the CPU 112. The CPU 112 is configured to close the switches 106 in response to the enable command 124. For example, the ECU 122 normally generates the enable command 124 as long as the vehicle is in an on mode. When the vehicle instead enters an off mode (i.e., the vehicle is turned off), the ECU 122 is off and does not generate the enable command 124. With possible exceptions as described below, the CPU 112 can be configured to open the switches 106 in response to the enable command 124 no longer being generated by the ECU 122. As such, the CPU 112 can maintain an enable command of the command 114 as long as two conditions are satisfied: the enable command 124 from the ECU 122 is present, and no overload condition is detected in the circuits of the switches 106.

One or more of the switches 106 can be a multiplex switch. Here, the switch 106A is a multiplex switch that is positioned in the conductor 108A and also in a conductor 108D that is here shown truncated for simplicity. The conductor 108D can supply the low-voltage power to another one (not shown) of the devices 104. The switch 106A has a select pin 126 that the CPU 112 is configured to use in sensing the respective currents flowing through the conductors 108A and 108D.

Figures 2A, 2B:
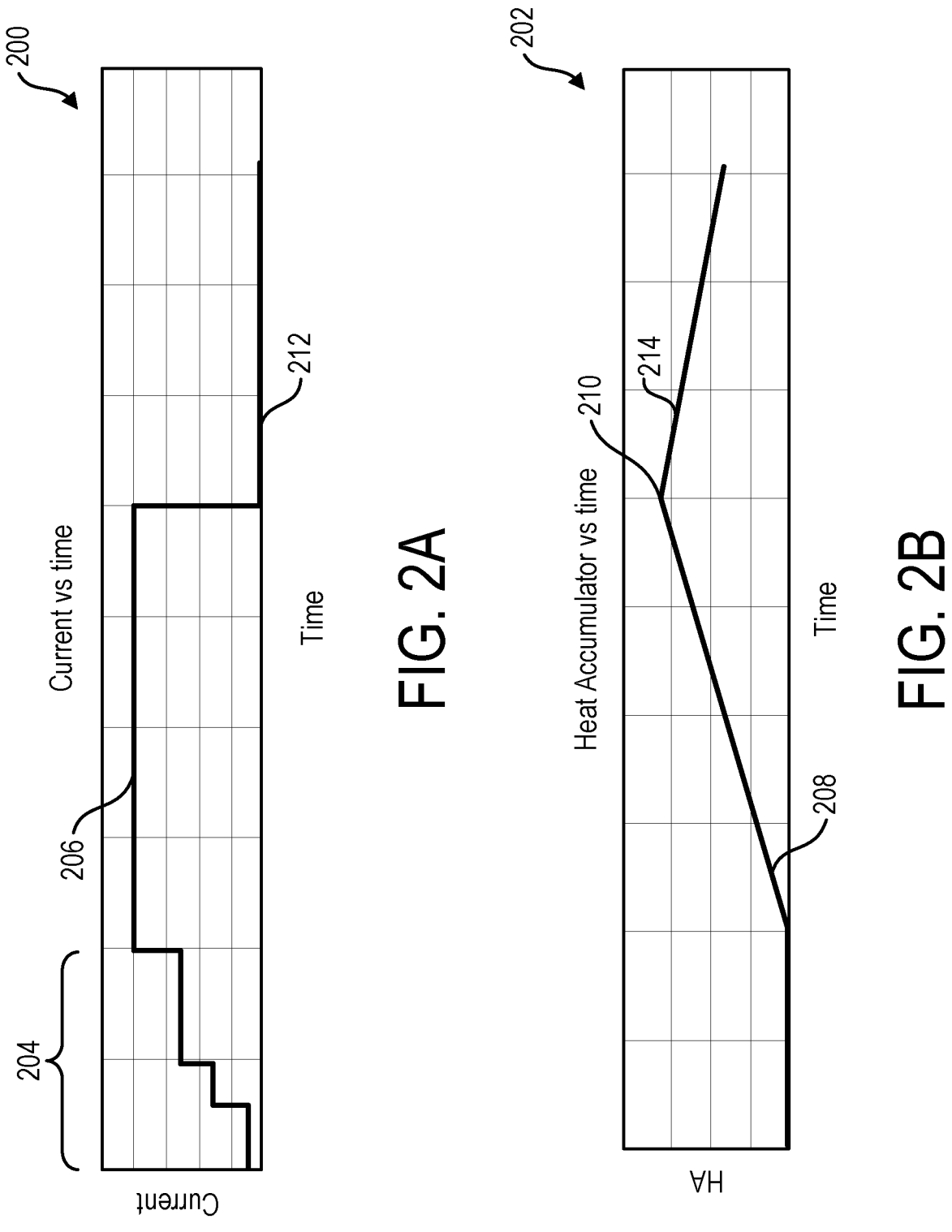
FIGS. 2A-2B show examples of detecting an overload condition.

FIGS. 2A-2B show examples of detecting an overload condition. FIG. 2A shows a graph 200 where current is indicated on a vertical axis and time is indicated on a horizontal axis. FIG. 2B shows a graph 202 where heat accumulation is indicated on a vertical axis and time is indicated on a horizontal axis. The graphs 200 and 202 exemplify evets occurring during the same scenario, as will now be described.

With reference again to FIG. 1, a heat accumulation calculation can be performed based on currents that the CPU 112 senses using the signals 116. In some implementations, the heat accumulation calculation is performed as follows for each circuit:

$$HA_k = HA_{k-1} + \left( I_k^2 \times R \right) - CF,$$

where $HA_k$ is the accumulated heat in an iteration. $HA_k$ can be defined to be equal to zero if $HA_k$ as calculated falls below zero (i.e., if $HA_k < 0$). In the above calculation:

k is the index of the iteration (e.g., k identifies the present value and k−1 identifies a most recent previous value), and so on;

$I_k$ is the current through the circuit (e.g., through the conductor);

$$R = \frac{CF}{I_r^2},$$

where $I_r$ is the rated current of the circuit; and

CF is the cooling factor (e.g., defined to be a constant value).

The CPU 112 can open the corresponding one of the switches 106 when $HA_k > HA_{max}$ in the above calculation, where $HA_{max}$ is a heat accumulation threshold. The CPU 112 can close the corresponding one of the switches 106 when $HA_k = 0$ in the above calculation.

Referring now also to the graphs 200 and 202, some examples will be provided. During a region 204 of time, the current through the circuit can increase, as indicated in the graph 200. Because of the subtraction of the cooling factor CF, and because the accumulated heat $HA_k$ is defined to be zero when the calculated sum falls below zero, the graph 202 can have a zero value in the region 204.

After the region 204, the graph 200 can have a substantially constant value 206 for the current. Here, this value is large enough for the calculation to yield a nonzero heat accumulation. In the graph 202, a portion 208 corresponds to the increasing accumulation that is calculated as part of the overload heat determination. The calculation comes to exceed the accumulation threshold $HA_{max}$ at a time 210 in the graph 202. This can trigger the CPU 112 to open the switch of the corresponding circuit (e.g., this can be referred to as a soft blow of an electronic fuse).

After the switch has been opened, current no longer flows through the circuit in a portion 212 of the graph 200. The heat accumulation calculation will therefore begin to decrease, as indicated in a portion 214 of the graph 202. For example, this can be characterized as a period of cooling off for the corresponding circuit. The CPU 112 can again close the corresponding one of the switches 106 when HA$_k$=0 in the above calculation (i.e., after sufficient cooling).

Figure 3:
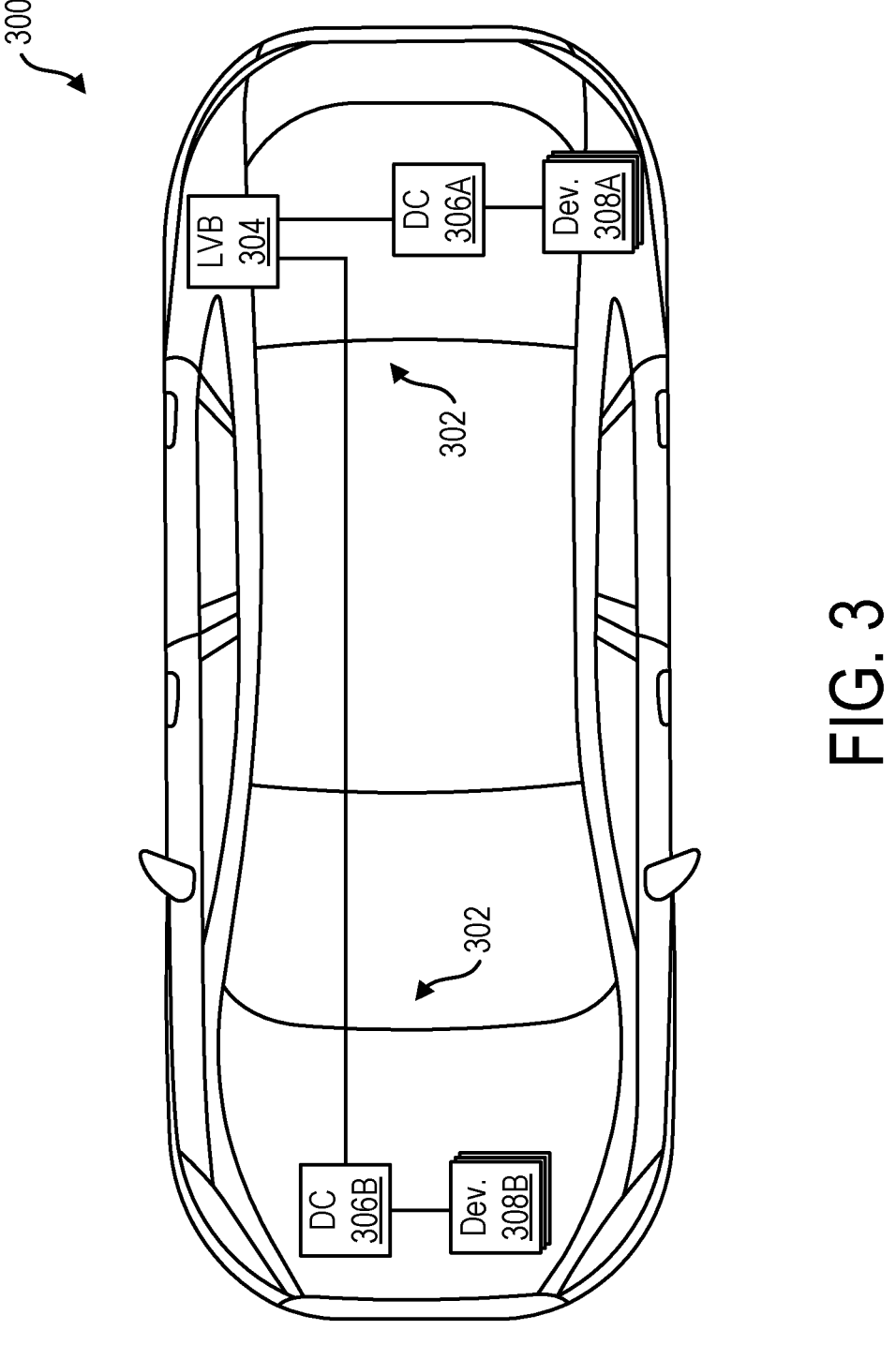
FIG. 3 shows an example of a vehicle with a low-voltage system that provides wiring protection without using fuses.

FIG. 3 shows an example of a vehicle 300 with a low-voltage system 302 that provides wiring protection without using fuses. The low-voltage system 302 can be used with one or more other examples described elsewhere herein. The low-voltage system 302 includes a low-voltage battery 304 that provides low-voltage power, and any number of distribution centers that include switches to selectively interrupt the low-voltage power. Here, distribution centers 306A-306B are shown. Each of the distribution centers 306A-306B is coupled to any number of devices configured to operate using the low-voltage power. Here, the distribution center 306A has devices 308A, and the distribution center 306B has devices 308B.

The distribution centers 306A-306B can be positioned anywhere in the vehicle 300 where it is most practical. Because the distribution centers 306A-306B need not be accessible to a customer, their positioning is very flexible from a packaging standpoint. Some or all of the distribution centers 306A-306B can be positioned as close to the respective consumer devices as is practicable, in order to minimize the amount of wiring to the devices. The distribution center 306A can be positioned near (e.g., at or in close proximity to) the rear of the vehicle 300, and/or the distribution center 306B can be positioned near (e.g., at or in close proximity to) the front of the vehicle 300.

Figure 4:
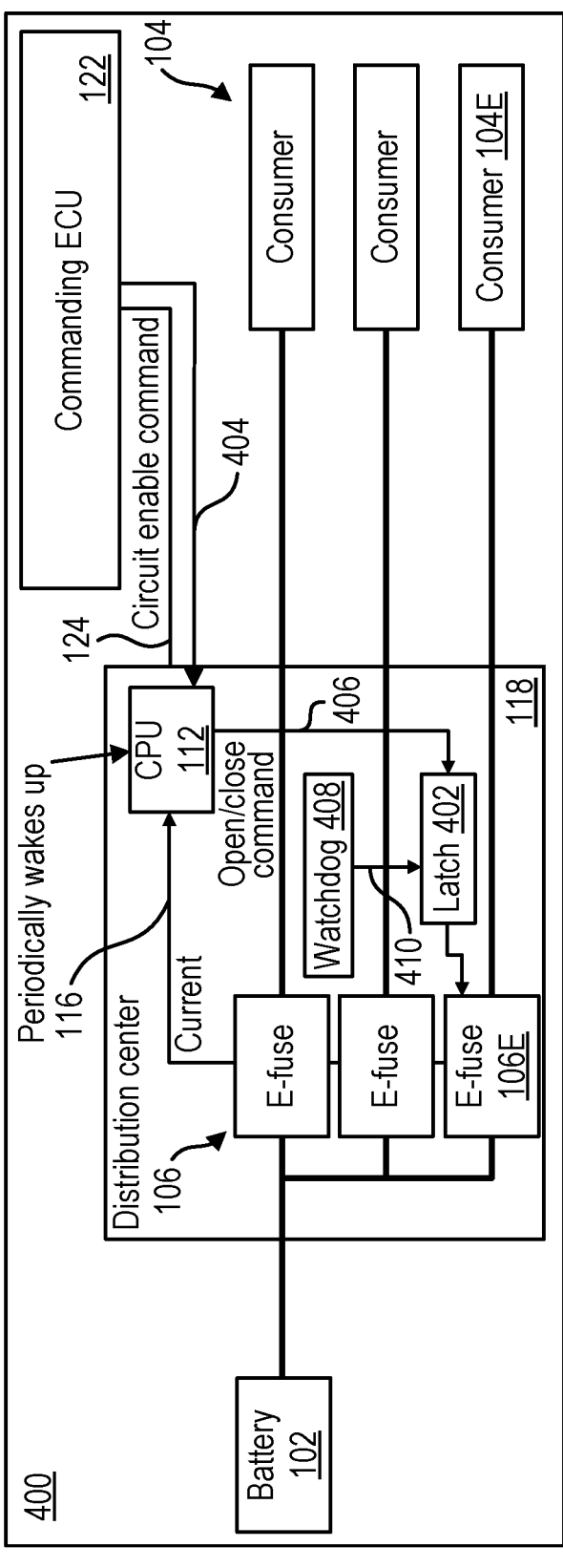
FIG. 4 shows an example of a system that monitors one or more circuits that stay powered up while the vehicle is turned off.

FIG. 4 shows an example of a system 400 that monitors one or more circuits that stay powered up while the vehicle is turned off. The system 400 can be used with one or more other examples described elsewhere herein. Some aspects of the system 400 can be identical or similar to the corresponding ones of the system 100 (FIG. 1) and are not described in detail below.

In the system 400, the distribution center 118 can among other things include a switch 106E for a device 104E that is required to be fed with the low-voltage power also when the vehicle is turned off. That is, while the ECU 122 is off and no longer generates the enable command 124, the device 104E should remain powered by the low-voltage battery 102 and protected against an overload condition in its wiring.

The system includes a latch 402 coupled to the switch 106E. The latch 402 is always powered. The CPU 112 is configured to enter a sleep mode in response to a mode command 404 from the ECU 122. That is, the ECU 122 here can generate at least the enable command 124 which causes the CPU 112 to close those of the switches 106 that are for on-only devices, and also generate the mode command 404 which tells the CPU 112 whether it should be powered on or periodically enter a sleep mode.

When the CPU 112 periodically wakes up during its sleep mode it will check for an overload condition regarding the circuit of the switch 106E and the device 104E. For example, the CPU 112 reads the current on the circuit using the signal 116. If an overcurrent is detected, the CPU 112 will open the switch 106E. As such, while some of the devices 104 are not powered while the vehicle is turned off and the CPU 112 has entered its sleep mode, the device 104E remains powered. When the CPU 112 periodically wakes up from its sleep, it will check that the circuit of the device 104E and the switch 106E is not being overheated. If an overload condition is detected, the CPU 112 can open the switch 106E by providing a signal 406 to the latch 402.

The system 400 can provide wiring protection also for the scenario that the CPU 112 does not wake up from its sleep. A watchdog circuit 408 can be included in the distribution center 118. If the watchdog circuit 408 detects that the CPU 112 fails to wake up as scheduled, the watchdog circuit 408 can open the switch 106E by providing a signal 410 to the latch 402 (e.g., disabling the latch).

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A vehicle comprising:
a low-voltage battery to provide low-voltage power;
devices configured to operate using the low-voltage power, each of the devices coupled to the low-voltage battery by a corresponding conductor, wherein the devices comprise all consumers of the low-voltage power in the vehicle;
switches to selectively interrupt the low-voltage power between the low-voltage battery and any of the devices, each of the switches positioned in a respective conductor of the conductors;
a central processing unit configured to detect an overload condition regarding any of the switches, and to open, in response to detecting the overload condition, the switch of the conductor between the low-voltage battery and the corresponding one of the devices; and an electronic control unit configured for providing an enable command to the central processing unit, wherein the central processing unit is further configured to close the switches in response to the enable command, wherein a first device of the devices is designated to operate also when the vehicle is in an off mode in which the electronic control unit is turned off, and wherein a first switch of the switches is positioned in a first conductor of the conductors, the first conductor positioned between the low-voltage battery and the first device.

2. The vehicle of claim 1, wherein the central processing unit and the switches are included in a distribution center.

3. The vehicle of claim 2, wherein the vehicle includes multiple distribution centers among which the switches are distributed, each of the distribution centers having a respective central processing unit.

4. The vehicle of claim 2, wherein the distribution center is packaged so as to not be customer accessible.

5. The vehicle of claim 1, wherein the central processing unit is configured to detect the overload condition by determining respective temperatures of the switches.

6. The vehicle of claim 1, wherein the central processing unit is configured to detect the overload condition by sensing respective currents flowing through the switches.

7. The vehicle of claim 6, wherein the central processing unit is configured to detect the overload condition upon determining that a current threshold is met.

8. The vehicle of claim 6, wherein the central processing unit is configured to detect the overload condition by performing a heat accumulation calculation based on the currents.

9. The vehicle of claim 1, wherein each of the switches comprises an electronic fuse.

10. The vehicle of claim 1, wherein the low-voltage power is about 12 volts.

11. A vehicle comprising:

a low-voltage battery to provide low-voltage power;

devices configured to operate using the low-voltage power, each of the devices coupled to the low-voltage battery by a corresponding conductor, wherein the devices comprise all consumers of the low-voltage power in the vehicle;

switches to selectively interrupt the low-voltage power between the low-voltage battery and any of the devices, each of the switches positioned in a respective conductor of the conductors; and a central processing unit configured to detect an overload condition regarding any of the switches, and to open, in response to detecting the overload condition, the switch of the conductor between the low-voltage battery and the corresponding one of the devices, wherein the central processing unit is configured to detect the overload condition by sensing respective currents flowing through the switches, and wherein at least one of the switches is a multiplex switch positioned in at least two of the conductors corresponding to respective at least two of the switches, the multiplex switch having a select pin that the central processing unit is configured to use in sensing the respective currents flowing through the respective at least two of the conductors.

12. The vehicle of claim 11, further comprising an electronic control unit configured for providing an enable command to the central processing unit, wherein the central processing unit is further configured to close the switches in response to the enable command.

13. The vehicle of claim 12, wherein the central processing unit is further configured to open the switches in response to the enable command no longer being generated by the electronic control unit.

14. The vehicle of claim 12, wherein a first device of the devices is designated to operate also when the vehicle is in an off mode in which the electronic control unit is turned off, wherein a first switch of the switches is positioned in a first conductor of the conductors, the first conductor positioned between the low-voltage battery and the first device, the vehicle further comprising:

a latch coupled to the first switch, wherein the central processing unit is further configured to periodically wake up during the off mode and monitor the first switch for the overload condition, and actuate the latch to open the first switch in response to detecting the overload condition.

15. A vehicle comprising:

a low-voltage battery to provide low-voltage power;

devices configured to operate using the low-voltage power, each of the devices coupled to the low-voltage battery by a corresponding conductor, a first device designated to operate also when the vehicle is in an off mode;

switches to selectively interrupt the low-voltage power between the low-voltage battery and any of the devices, each of the switches positioned in a corresponding one of the conductors, a first switch positioned in a first conductor between the low-voltage battery and the first device;

a latch coupled to the first switch; and a central processing unit configured to i) monitor the switches for an overload condition while the vehicle is in an on mode, and in response to detecting the overload condition, open the switch of the conductor between the low-voltage battery and the corresponding one of the devices, and ii) periodically wake up during the off mode and monitor the first switch for the overload condition, and actuate the latch to open the first switch in response to detecting the overload condition.

16. The vehicle of claim 15, further comprising an electronic control unit configured for providing an enable command to the central processing unit, wherein the central processing unit is further configured to close the switches, and actuate the latch to close the first switch, in response to the enable command.

17. The vehicle of claim 16, wherein the central processing unit is further configured to open the switches, except the first switch, in response to the enable command no longer being generated by the electronic control unit.

18. The vehicle of claim 15, further comprising a watchdog circuit coupled to the latch and to the central processing unit, the watchdog circuit configured to i) detect whether the central processing unit fails to wake up during the off mode, and ii) in response to detecting that the central processing unit fails to wake up, disable the latch so that the first switch is opened.

19. The vehicle of claim 15, wherein the devices comprise all consumers of the low-voltage power in the vehicle.

20. The vehicle of claim 15, wherein the central processing unit is configured to detect the overload condition by sensing respective currents flowing through the switches.

* * * * *